United States Patent [19]

Park

[11] Patent Number: 5,631,783

[45] Date of Patent: May 20, 1997

[54] MAGNETIC DISC APPARATUS EMPLOYING CONSTANT-DENSITY RECORDING AND DRIVER ACCESS METHOD WHERE A WEDGE ID FIELD AND A PSEUDO ID FIELD ARE RECORDED

[75] Inventor: Jung-Il Park, Suwon, Rep. of Korea

[73] Assignee: SamSung Electronics Co., Ltd., Suwon, Rep. of Korea

[21] Appl. No.: 455,025

[22] Filed: May 31, 1995

[30] Foreign Application Priority Data

Dec. 21, 1994 [KR] Rep. of Korea ............... 35785/1994

[51] Int. Cl.$^6$ ........................................ G11B 5/09
[52] U.S. Cl. ........................... 360/51; 360/48; 360/49
[58] Field of Search ............................ 360/51, 48, 49

[56] References Cited

U.S. PATENT DOCUMENTS

| | | |
|---|---|---|
| 4,682,253 | 7/1987 | Leslie . |
| 4,811,135 | 3/1989 | Janz . |
| 4,823,212 | 4/1989 | Knowles et al. . |
| 4,862,295 | 8/1989 | Tanaka et al. ............... 360/48 |
| 4,956,727 | 9/1990 | Bezinque et al. . |
| 4,977,472 | 12/1990 | Volz et al. . |
| 5,121,280 | 6/1992 | King . |
| 5,193,034 | 3/1993 | Tsuyoshi et al. . |
| 5,278,703 | 1/1994 | Rub et al. . |
| 5,422,763 | 6/1995 | Harris ............................ 360/48 X |
| 5,475,540 | 12/1995 | Gold ............................. 360/51 X |

Primary Examiner—W. C. Kim
Attorney, Agent, or Firm—Robert E. Bushnell, Esq.

[57] ABSTRACT

A magnetic disc apparatus employing a constant-density recording type and a magnetic disc driver for accessing data thereon. The magnetic disc apparatus comprises a plurality of tracks extended in a circumferential direction on the magnetic disc apparatus surface; a plurality of servo and data information areas which are provided in the circumferential direction of each track; a WID (wedge identification) field for recording the ID for data sectors positioned in one data information area, the ID being recorded in only one interval for each data information area; and a PID (pseudo identification) field positioned in front of each data sector and having an interval corresponding to transfer time of the PID (i.e. the ID of a corresponding data sector) generated from a WID field during access of the magnetic disc apparatus.

28 Claims, 9 Drawing Sheets

MAGNETIC DISC APPARATUS EMPLOYING CONSTANT-DENSITY RECORDING AND DRIVER ACCESS METHOD WHERE A WEDGE ID FIELD AND A PSEUDO ID FIELD ARE RECORDED

CROSS-REFERENCE TO RELATED APPLICATIONS

This application makes reference to, incorporates the same herein, and claims all benefits incurring under 35 U.S.C. §119 from an application for Magnetic Disc Apparatus Employing Constant-Density Recording And Driver Access Method filed in the Korean Industrial Property Office on 21 Dec. 1994 and there assigned Ser. No. 35785/1994.

BACKGROUND OF THE INVENTION

The present invention relates to a magnetic write/read method of digital information, and more particularly to a magnetic disc apparatus employing constant-density recording and an access method of a magnetic disc driver for accessing data.

The magnetic disc apparatus is capable of storing a large amount of data, providing access to the data at a high rate of speed, and therefore is widely used as an auxiliary memory in computer systems. One type of recording on the magnetic disc apparatus has been based on constant-track-capacity recording. With this type of recording, the magnetic disc apparatus rotates at a constant speed and has the same information capacity per track on both interior and exterior tracks. However, this type of recording has some problems in that the recording density of information on the exterior tracks is rather low, thereby reducing the storage efficiency of the magnetic disc.

In order to solve such a problem, a "constant-density" or a "zone-bit" type of recording has been proposed. The constant-density type of recording is disclosed, for example, in an article "Constant Density Recording Comes Alive With New Chips" by Mark S. Young on pages 141–144 of "Electronic Design" published 13 Nov. 1986. Constant-density recording allows all tracks, including the interior and exterior tracks, to have substantially the same information density so that the information capacity of the magnetic disc can be improved in a system using a small-sized disk driver. In accordance with the constant-density type of recording, the information recording area of the magnetic disc surface is divided into a plurality of zones in which the recording density is constant from the center of the disc to areas extending radially from the center. In the respectively divided track zones, the number of data sectors varies. That is, tracks in the exterior zone have more data sectors than tracks in the interior zone. The data sector indicates a unit area in which the magnetic disc driver accesses data on the magnetic disc surface. Furthermore, the data sector has a uniform size, e.g. 512 bytes, irrespective of its position on the magnetic disc surface. When an embedded servo sector is employed in a servo method, one data sector can be divided into two segments according to the respective zones of the magnetic disc surface. Use of the embedded servo sector is one way to provide location information of the head to the magnetic disc driver. With the embedded servo sector, tracks are respectively divided into a servo information area and a data information area in a circumferential direction about the disc. The servo information area, in which the embedded servo information is recorded, provides the servo sector; and, the data information area, in which real data is recorded, provides the data sector.

As mentioned above, constant-density recording enables all of the tracks to have substantially the same information density, so that a greater amount of data can be recorded on the magnetic disc surface per track, unlike the conventional constant-track-capacity type of recording. Therefore, constant-density recording is widely used in magnetic disc apparatuses.

SUMMARY OF THE INVENTION

It is therefore an object of the present invention to provide an improved magnetic disc apparatus.

It is another object to provide a magnetic disc apparatus, disc driver, and an access method to increase data storage capacity with a constant-density type of recording.

It is still another object to provide a magnetic disc apparatus, disc driver, and an access method capable of reducing a timing margin required between an identification area and a data area in a data sector of the magnetic disc apparatus.

These and other objects of the present invention can be achieved with a magnetic disc apparatus employing a constant-density type of recording and a magnetic disc driver for accessing data thereon. The magnetic disc apparatus comprises a plurality of tracks extended in a circumferential direction on the surface of the magnetic disc apparatus; a plurality of servo and data information areas which are provided in the circumferential direction of each track; a WID (wedge identification) field for recording signals that identify data sectors positioned in one data information area, the identification signals being recorded in only one interval for each data information area; and a PID (pseudo identification) field representing an interval corresponding to a transfer time of the PID (i.e. the ID of a corresponding data sector) generated from a WID field during access of the magnetic disc apparatus.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE PREFERRED EMBODIMENT

Figure 1:
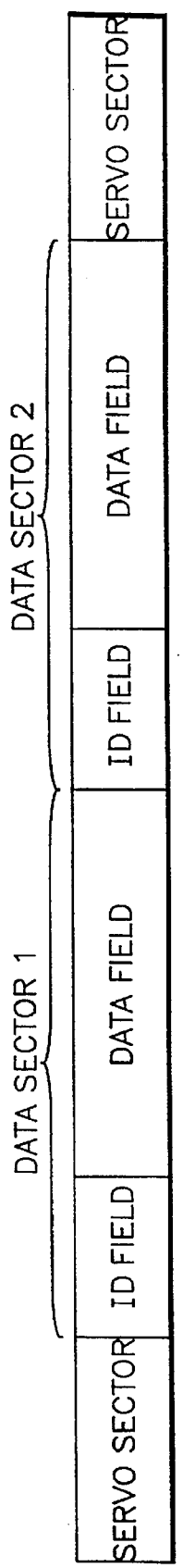
FIG. 1 is a data format diagram of a magnetic disc surface of a conventional constant-density recording type.

FIG. 1 shows an embodiment of a sector format on a magnetic disc surface of a constant-density recording type. The embodiment of FIG. 1 is a sector format of one track positioned in a zone having two complete data sectors between the servo sectors on the magnetic disc surface, i.e. a zone having undivided data sectors in an adjacent data information area. The sector format is not necessarily shown at an accurate scale. The two data sectors, i.e. data sectors 1 and 2, are each divided into an ID (Identification) field and a data field. The ID field is an area in which information for enabling the head to identify the corresponding data sector is recorded. The data field behind the ID field is the area in which the actual data is recorded.

Figure 2:
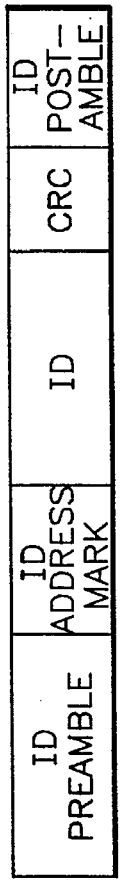
FIG. 2 is a detailed format diagram of an ID of FIG. 1.

Referring to FIG. 2, the specifics of the ID field are shown. The ID field is comprised of an ID preamble, an ID address mark, an ID, a CRC (Cyclic Redundancy Code), and an ID postamble which are successively connected. The ID preamble provides a clock synchronization required in reading the ID field and also provides a gap positioned in the front of the ID field. The ID address mark indicates the start of the ID, to thereby provide synchronization to read the ID that follows. The ID is information for enabling the magnetic head to identify the sector in which the head is positioned, e.g. a sector number, a head number, and a cylinder number. The CRC is an error detection code for detecting and correcting errors in the ID address mark and the ID, and is produced by general use of a CRC-CCIT generating polynomial. The ID postamble provides a timing margin required after reading the ID.

Figure 3:
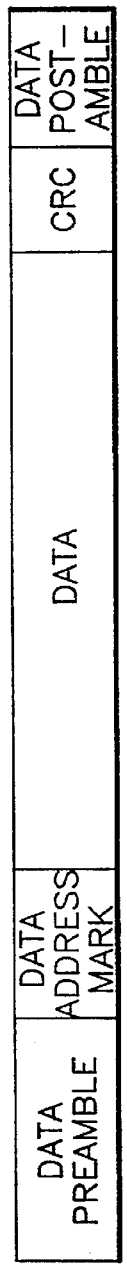
FIG. 3 is a detailed format diagram of a data field of FIG. 1.

Referring to FIG. 3, the specifics of the data field are shown. The data field is comprised of a data preamble, a data address mark, data, a CRC, and a data postamble, which are successively connected. The data preamble provides clock synchronization required in reading the data field and also provides a gap between the ID field and the data field, the data preamble being positioned between the ID postamble and the data address mark. The data address mark indicates the start of the data, to thereby provide the synchronization required when the magnetic disc driver reads the data. The data is digital information stored on the magnetic disc surface. The CRC is an error detection code for detecting and correcting errors in the data address mark and the data, and is produced by general use of the CRC-CCITT generating polynomial. The data postamble provides a timing margin required after reading the data.

In general, since the ID postamble and the data preamble, and the data postamble and the ID preamble are respectively adjacent to each other, they are often used together without distinction.

As discussed above, when data information is recorded on a track of the magnetic disc surface having more than two data sector between the servo sectors, after data is recorded in a preceding data sector, the ID field of the following data sector is read. Therefore, when changing to a read state from a write state, a switching noise is often generated due to variations in the electrical current applied to the magnetic head, the switch noise being called a barkhausen noise, a popcorn noise, or a wiggle noise. Generally, switching noise is generated because the magnetic disc driver shares one head during read and write operations in the magnetic disc apparatus. Furthermore, switching noise often causes malfunctions with the magnetic disc driver.

In order to prevent such malfunctions, a minimum timing margin is necessary in order to stabilize the head when the write state changes to the read state. The timing margin is an absolute time value regardless of the data transfer rate. For example, a thin film head needs a timing margin of about 7 µs~10 µs for the write-read operation change. Thin film heads are widely used in high speed/high density magnetic disc apparatuses. Therefore, as shown in FIGS. 1 through 3, the ID preamble is designed to last during the write-read transition time and provides a gap between the data field and the following ID field on the magnetic disc apparatus having the sector format discussed above.

As described above, the magnetic disc apparatus has a timing margin between the data field and the ID field corresponding to a write-read change time. As a result, there has been a problem in that the total capacity of the magnetic disc apparatus is reduced by the timing margin. The amount of capacity reduction is even greater when the magnetic disc surface accommodates higher recording densities and data transfer rates, since the amount of data per unit time to access increases in accordance with the increase in recording density and the data transfer rate, and the required timing margin always remains constant.

In the following description, specific details such as detailed circuit constructions, numbers of bits/bytes, frequency, operational time, and logic states are set forth to provide a more thorough understanding of the present invention. It will be apparent, however, to those skilled in the art, that the present invention may be practiced without these specific details. In other instances, well known features have not been described in detail, in order to not obscure the present invention.

Figure 4:
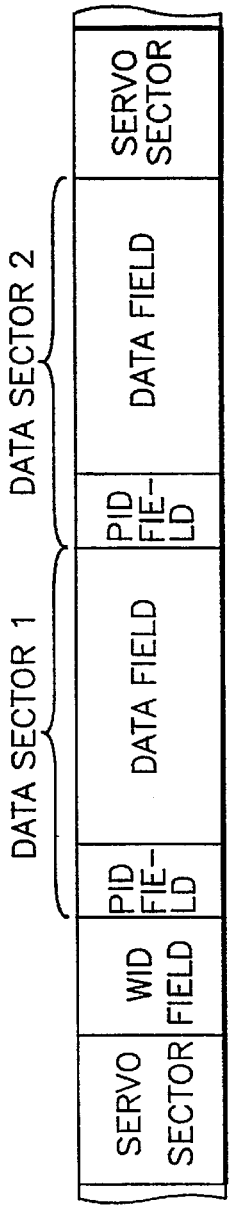
FIG. 4 is a data format diagram of a magnetic disc surface according to the present invention.

FIG. 4 shows an embodiment of a sector format according to the principles of the present invention. That is, FIG. 4 shows a sector format having two complete data sectors between servo sectors in one track of the magnetic disc surface, i.e. the data sectors which are not divided in the adjacent data information area. The format is not necessarily limited to only two consecutive data sectors as shown, and is not necessarily shown to scale. In FIG. 4, a field following the servo sector includes the ID for data sectors 1 and 2. Such an ID is called a wedge ID (hereinafter, referenced to as "WID") in the present invention. As mentioned hereinafter, the ID for identifying data sectors 1 and 2 positioned behind the WID field is produced. Such an ID generated from the WID field is called a "pseudo ID" (hereinafter, referenced to as "PID") in the present invention. Data sectors 1 and 2 following the WID field are each divided into a PID field and a data field. The PID field is arranged in the front of the data sector and lasts as a gap during an interval corresponding to the transfer time of the PID (i.e. the ID of a corresponding data sector) generated from the WID during access of the magnetic disc apparatus. Data fields are identified by their respective PID fields.

Figure 5:
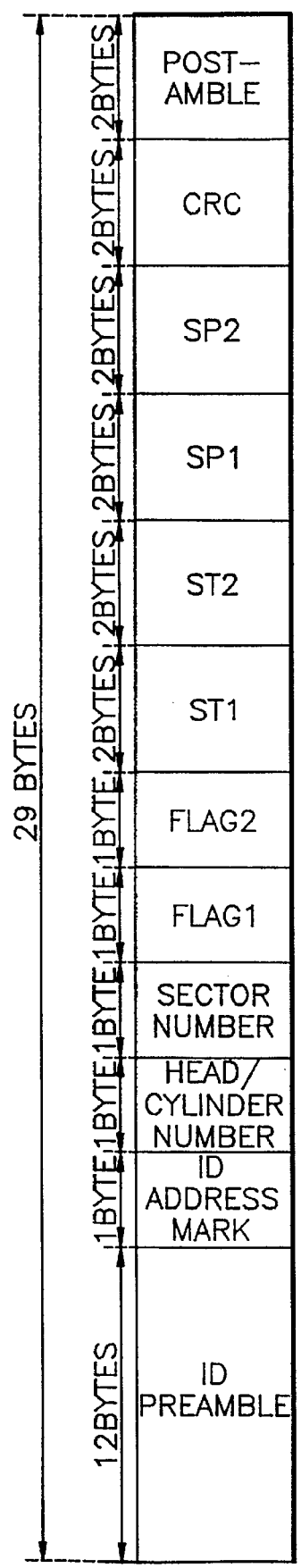
FIG. 5 is a detailed format diagram of a WID according to the present invention.

FIG. 5 shows an embodiment of a detailed format of the WID of FIG. 4. The format may not be accurate. In FIG. 5, an ID preamble is comprised of 12 bytes and is a signal used for synchronizing a clock when the WID field is read by the magnetic disc driver. An ID address mark of 1 byte indicates the start of the head information that follows. Also, the ID address mark is an area to record a specific pattern, e.g. A5H (a hexadecimal value), to again confirm the ID area having position and characteristics of each data sector positioned in the corresponding data information area. At 1 byte, a head/cylinder number area represents an area having location information of the head and the cylinder number being the ID of the track. At 1 byte, a sector number is of the data sector(s) behind the WID field. The head/cylinder number and the sector number are the head information to indicate the data sector number at which the current head is positioned. When one head and one side of the magnetic disc are used in the magnetic disc driver, the head/cylinder number of the head information is omitted. There are flags 1 and 2 each having 1 byte on the magnetic disc surface. The flags 1 and 2 indicate whether or not two data sectors positioned at the corresponding data information area are available. Further, there are ST1 and ST2 each having 2 bytes on the magnetic disc surface. The ST1 and ST2 are location information to indicate the positions of the two data sectors which are positioned in the corresponding data information area. The most significant bit of the location information ST2 indicates whether the first data sector is divided or not. For example, if the most significant bit of the location information ST2 is "1", it means that the first data sector is divided by the next data information area, whereas if it is "0", it means that the first data sector is an entire data sector. Moreover, there are SP1 and SP2 each having 2 bytes on the magnetic disc surface. The SP1 and SP2 indicate division information for data sector started within the corresponding data information area and are also used for the constant-density recording. For example, in case that the data field of the data sector 2 is divided into two segments and the subsequent segment is thus positioned at the next data information area, if a first segment of one data field of 512 bytes is 100 bytes and a second segment thereof is 412 bytes, a value of the division information SP1 is 100 and that of the division information SP2 is 412. In the meantime, it is general to access data divided by such the division information SP1 and SP2 in the constant-density recording type. As 2 bytes, the CRC is a value checked up to the SP2 from the ID address mark of the current WID field, the CRC being an error detection code for detecting and correcting error and being generated by using a general CRC-CCITT generating polynomial. As 2 bytes, the postamble is of the WID field and functions as a gap for the following PID field.

Here, the real WID information becomes 12 bytes, i.e., 96 bits, up to the division information SP2 from the head/cylinder number.

Figure 6:
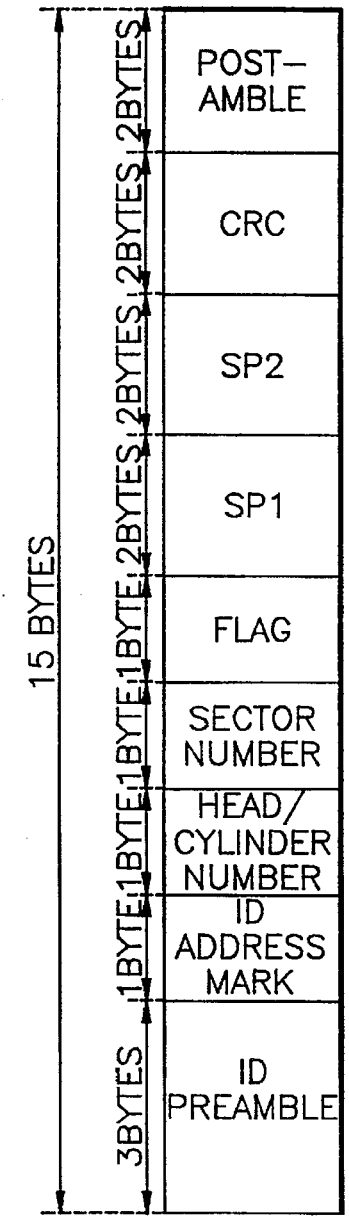
FIG. 6 is a detailed format diagram of a PID according to the present invention.

FIG. 6 shows an embodiment of the detailed format of the PID generated from the WID. The format may not be accurate. In FIG. 6, the ID preamble is used for synchronizing the clock when the magnetic disc driver accesses data on the magnetic disc surface, the ID preamble being 3 bytes. As a synchronization signal of 1 byte, the ID address mark informs the start of the following head information. As 1 byte, the head/cylinder number is an area to have the location information of the head and the cylinder number being the ID of the track. As 1 byte, the sector number is of the data sector behind the WID field. Further, in case that the sector number is a first PID after reading the WID, it is the same as the sector number included in the WID and in case that the sector number is a second PID, it is increased by 1 from the sector number included in the WID. As 1 byte, the flag becomes the flag 1 within the WID in case of the first PID and also becomes the flag 2 in case of the second PID. The SP1 and SP2 are the division information for the data sector started in the corresponding data information area and for the constant-density recording. In case that the first data sector of the corresponding information area is divided, i.e., the most significant bit of the location information ST2 of the WID is "1", the division information SP1 and SP2 of the first PID become those of the WID, and those of the second PID have an any value, i.e., 0FFFH (a value of the hexadecimal). In case that the first data sector of the corresponding information area is not divided, i.e., the most significant bit of the location information ST2 of the WID is "0", the division information SP1 and SP2 of the first PID have an any value "0FFFH", and those of the second PID become the division information of the WID. As 2 bytes, the CRC is an added value up to the SP2 from the ID address mark of the current WID field, the CRC being an error detecting code for detecting and correcting the error and being generated by using a general CRC-CCITT generating polynomial. As 2 bytes, the postamble is that of the PID field.

Figure 7:
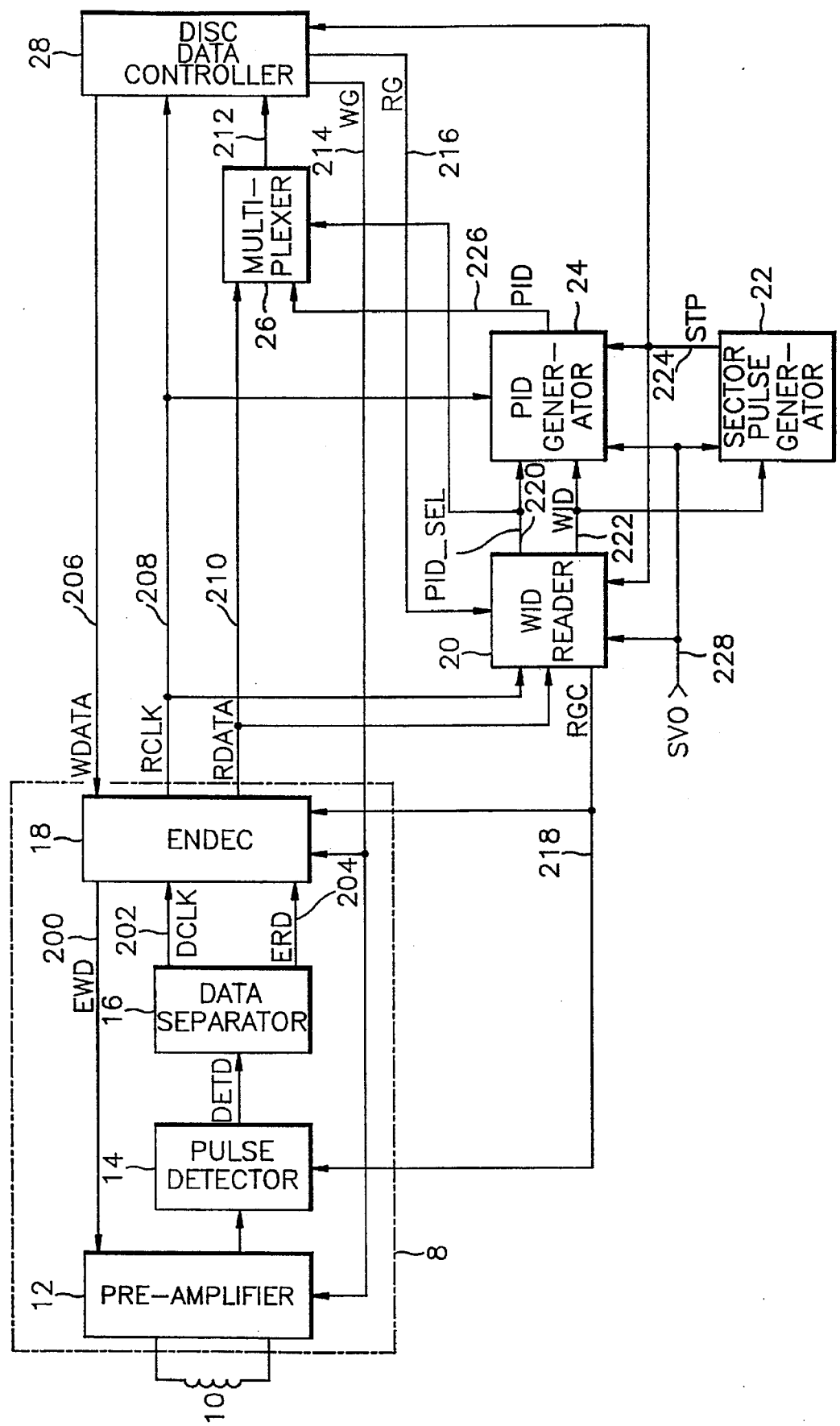
FIG. 7 is a block construction diagram of the magnetic disc driver to access data on the magnetic disc surface having the other format according to the present invention.

As shown in FIG. 7, the magnetic disc driver according to the present invention reads the WID from the data read from the magnetic disc surface to thereby generate the PID. With the generated PID, the magnetic disc driver accesses the digital information on the magnetic disc surface. Further, the magnetic disc driver of FIG. 7 operates as a read mode or a write mode by control of a disc data controller 28.

The disc data controller 28 uses a general disc data controller such as a DP8466 and responds to an input of the sector pulse STP to inform the start of each of the data sectors. In accordance with the response, during the read mode the disc data controller 28 generates a read gate signal RG in a PID field and a data field, and the same time inputs read data RDATA and a read clock signal RCLK from a read/record channel 8, whereas during the write mode, it generates the read gate signal RG and a write gate signal WG in the PID field interval and in the data field interval, respectively and outputs the write data WDATA to the read/write channel 8.

The general read/write channel 8 comprises a preamplifier 12, a pulse detector 14, a data separator 16 and an encoder/decoder ENDEC 18 to read/write the digital information through a head 10 for read/write on the magnetic disc surface. The preamplifier 12 operates as the write mode when the write gate signal WG is input at an active state and also operates as read mode when the read gate control signal RGC is input at the active state. During the read mode the preamplifier preamplifies the signal picked-up by the head 10 and during the write mode the preamplifier enables the encoded write data EWD to be written on the magnetic disc surface, the encoded write data EWD being applied from the ENDEC 18 by driving the head. The pulse detector 14 operates when the read gate control signal RGC is input at the active state and detects the data from the signal preamplified in the preamplifier 12. The data separator 16 separates the read data ERD encoded from the data DETD detected in the pulse detector 14 from the data clock signal DCLK to thereby apply the separated data to the ENDEC 18. The ENDEC 18 operates as the read mode when the read gate control signal RGC is input at the active state, inputs the encoded read data ERD from the data separator 16 and the data clock signal DCLK, and decodes the encoded read data ERD to thereby output the decoded ERD to the read data RDATA. On the other hand, the ENDEC 18 operates as the write mode when the write gate signal WG is input at the active state and encodes the write data WDATA applied from the disc data controller 28 to thereby apply the encoded write data EWD to the preamplifier 12.

The WID reader 20 reads the WID from the magnetic disc surface through the read/write channel 8 in response to a servo pulse SVO generated in the end of the respective servo information areas during the access of the magnetic disc apparatus. At this time, the WID reader 20 reads the WID from the read data RDATA by generating the read gate control signal RGC during the WID field interval and applying the signal RGC to the read/write channel 8. Further, during the read mode the WID reader 20 operates the read/write channel 8 as the read mode by generating the read gate control signal RGC during the data field interval and applying the signal RGC to the read/write channel 8. Moreover, the WID reader 20 generates the PID selection signal PID-SEL in response to the sector pulse STP and the read gate signal RG.

A sector pulse generator 22 generates the sector pulse STP to inform the start position of each of the data sectors which are positioned in the corresponding data information area from the location information ST1 and ST2 included in the WID read by the WID reader 20.

A PID generator 24 generates the PID for the corresponding data sector from the WID in response to the sector pulse STP.

A multiplexer 26 selectively applies the read data RDATA output from the ENDEC 18 and the PID of the PID generator 24 to the disc data controller 28 through the PID selection signal PID-SEL. The multiplexer 26 selects the PID in the PID field interval to thereby apply the PID to the disc data controller 28, whereas it selectively applies the read data RDATA of the read/write channel 8 to the disc data controller 28 in the rest of intervals except the PID field.

Figure 8:
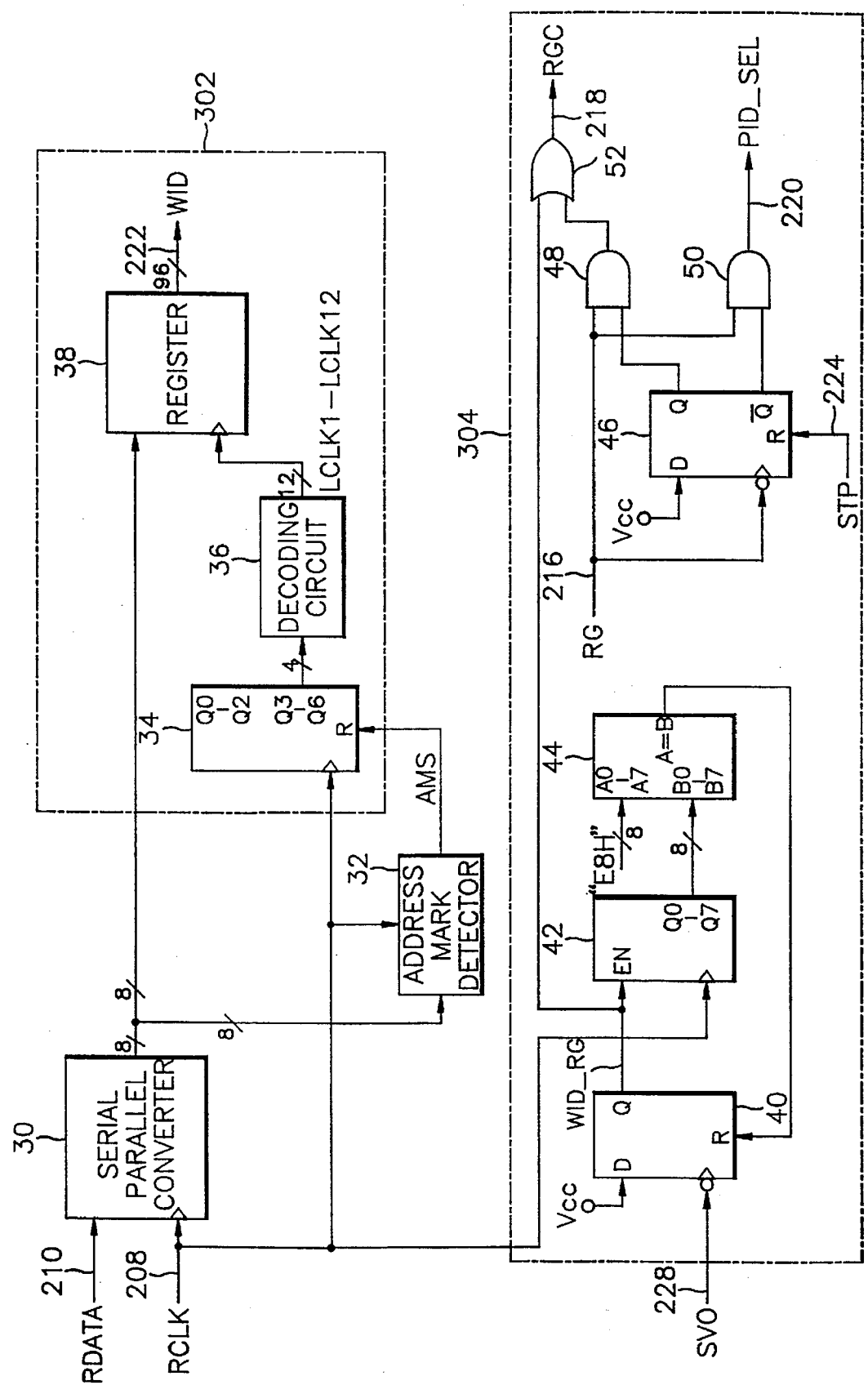
FIG. 8 is a detailed circuit diagram of an embodiment of a WID reader of FIG. 7.

FIG. 8 shows a detailed construction of the WID reader 20 of FIG. 7. Signal lines 208, 210, 216, 218, 220, 222, 224, and 228 of FIG. 8 have the same reference numerals as those of FIG. 7.

A serial-parallel converter 30 synchronizes the read data RDATA of the ENDEC 18 with the read clock signal RCLK and converts the read data RDATA thereof into the parallel data by the byte. As this time, the read data RDATA is input from the ENDEC 18 and becomes the data of a NRZ (None Return to Zero) format.

An address mark detector 32 compares the parallel data converted in the serial-parallel converters 30 with the predetermined ID address mark to thereby to detect the ID address mark of the WID. At this time, if the ID address mark of the WID is detected, the address mark detector 32 generates the address mark detection signal AMS set to the logic "high" state. The address mark detector 32 uses a general address mark detector to detect the address mark of a specific pattern.

A WID storage circuit 302 is comprised of a counter 34, a decoder 36, and a register 38. In response to the generation of the address mark detection signal AMS, the WID storage circuit 302 serially stores the 12 bytes (96 bits), by the byte, from the head/cylinder number to the division information SP2 in the parallel data converted by the serial-parallel converter 30, the head/cylinder number being the real WID information of the WID of FIG. 5. After being released by the address mark detection signal AMS set to the logic "high" state, the counter 34 counts the pulse of the read clock signal RCLK and outputs a count data having 4 bits from the upper portion of the count data having 7 bits through output terminals Q3–Q6. The decoder 36 decodes the output count data of the counter 34 and responds to the respective parallel data of the byte unit to thus generate the first to twelfth latch clock signals LCLK1–LCLK12 one by one. The register 38 is comprised of twelve registers having the storage capacity of 1 byte and stores the WID of 96 bits by the bite by the twelve latch clock signals LCLK1–LCLK12.

A timing controller 304 is comprised of flip-flops 40 and 46, a counter 42, a comparator 44, AND gates 48 and 50, and an OR gate 52. The timing controller 304 enables the read gate control signal RGC to be active to the logic "high" state in the WID field interval from a falling edge of the servo pulse SVO to indicate the start of the data information area, i.e., the end of the servo information area. Further, in response to the read gate signal RG generated in the data field interval, the timing controller 304 generates the read gate control signal RGC at the logic "high" state. Also in response to the sector pulse STP, the timing controller generates the PID selection signal PID-SEL set to the logic "high" state. In response to the falling edge of the servo pulse SVO, the flip-flop 40 latches power supply voltage VCC of the data input terminal D to thereby generate a WID read gate signal WID-RG set to the logic "high" state. The counter 42 counts the pulse of the read dock signal RCLK by being enabled by the WID read gate signal WID-RG set to the logic "high" state, and then outputs the count data of 8 bits obtained by the count. The comparator 44 compares the count data output in the counter 42 with the predetermined value "E8H" (232, in terms of decimal). If the value is the same to each other, the comparator 44 generates the signal at the logic "high" state to thereby reset the flip-flop 40 by applying the signal to a reset terminal R of the flip-flop 40. Here, the value "E8H" is to detect the WID field interval of 232 bits (29 bytes) like FIG. 5. That is, the comparator 44 generates the signal set to the logic "high" state after 232 bits from the start of the data information area. The flip-flop 46 is reset by the sector pulse STP set to the logic "high" state and is generated in the sector pulse generator 22. Further, the flip-flop 46 is set by latching the power supply voltage of the data input terminal D to the falling edge of the read gate signal RG applied from the disc data controller 28. The AND gate 48 ANDs the read gate signal RG and an output signal of an irreversible output terminal $\overline{Q}$ of the flip-flop 46. The AND gate 50 ANDs the read gate signal RG and the output signal of a reverse output terminal $\overline{Q}$ of the flip-flop 46 to thereby generate the PID selection signal PID-SEL set to the logic "high" state during PID field interval. The OR gate 52 ORs the WID read gate signal WID-RG and an output signal of the AND gate 48 to thereby generate the read gate control signal RGC set to the logic "high" state during WID field interval, whereas during the generation of the read gate signal RG in the data field interval, the OR gate 52 generates the read gate control signal RGC set to the logic "high" state.

Figure 9:
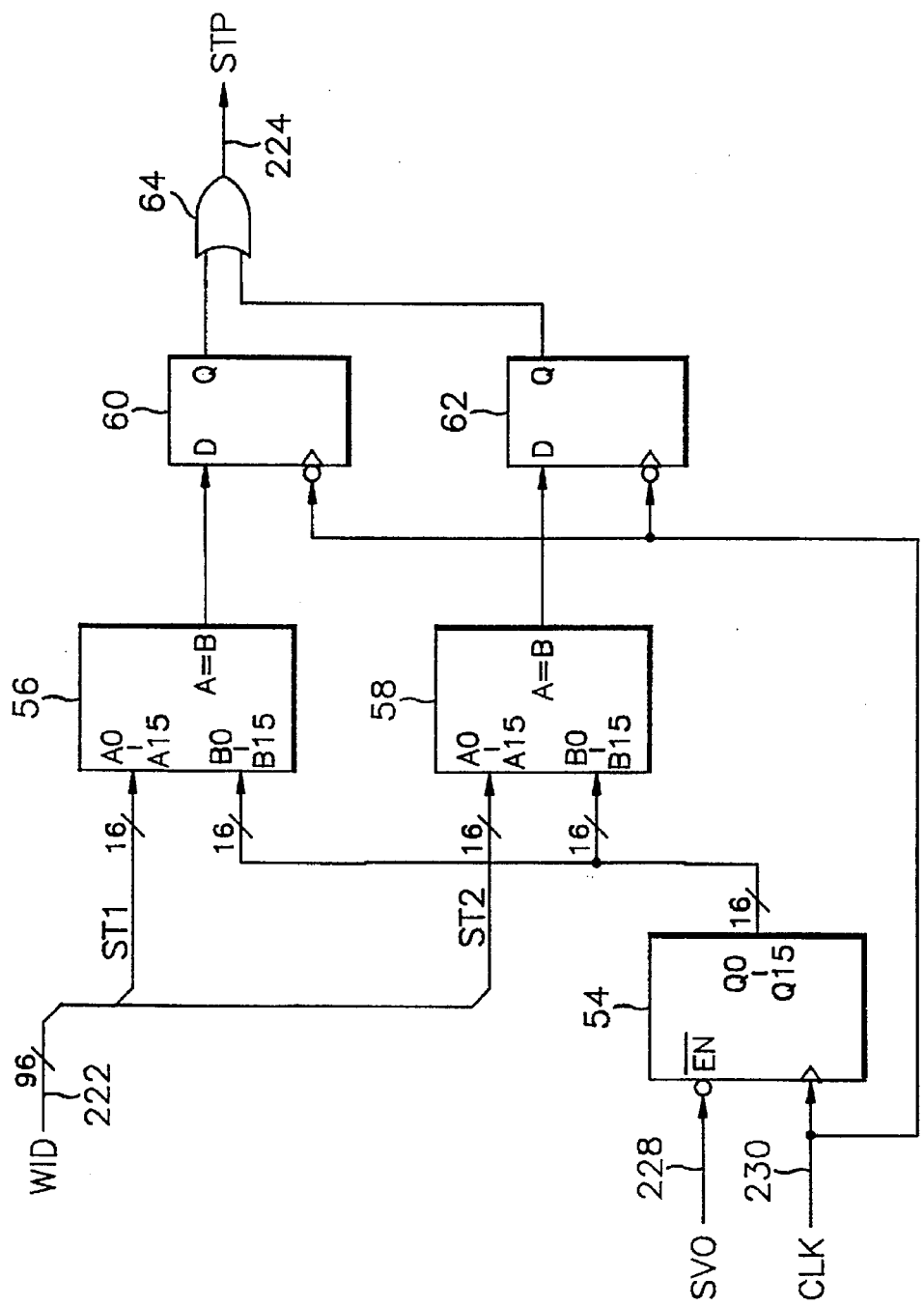
FIG. 9 is a detailed circuit diagram of an embodiment of a sector pulse generator of FIG. 7.

FIG. 9 shows a more detailed construction of the sector pulse generator 22 of FIG. 7. The signal lines 222, 224, and 228 of FIG. 9 have the same reference numerals as those of FIG. 7. The counter 54 is enabled in the falling edge of the servo pulse SVO, i.e., the data information area, and then counts the pulse of the dock signal CLK having a constant frequency. According to the result of the count, the counter 54 outputs the count data of 16 bits obtained by the counting operation through the output terminals Q0–Q15. The comparators 56 and 58 compares the location information ST1 and ST2 of the WID with the count data of the counter 54. If the result of the comparison is the same to each other, the comparators generate the signal set to the logic "high". The flip-flops 60 and 62 latch the output signals of the comparators 56 and 58 in the falling edge of the clock signal CLK, respectively. An OR gate 64 ORs the latched signals of flip-flops 60 and 62 to thereby generate the signal as the sector pulse STP. As this time, the sector pulse STP is generated from the end of the WID field, i.e., from the start of the PID field to one period of the clock signal CLK. As a signal having constant frequency, the clock signal CLK uses the frequency of 24 MH$_z$ in the present invention.

Figure 10:
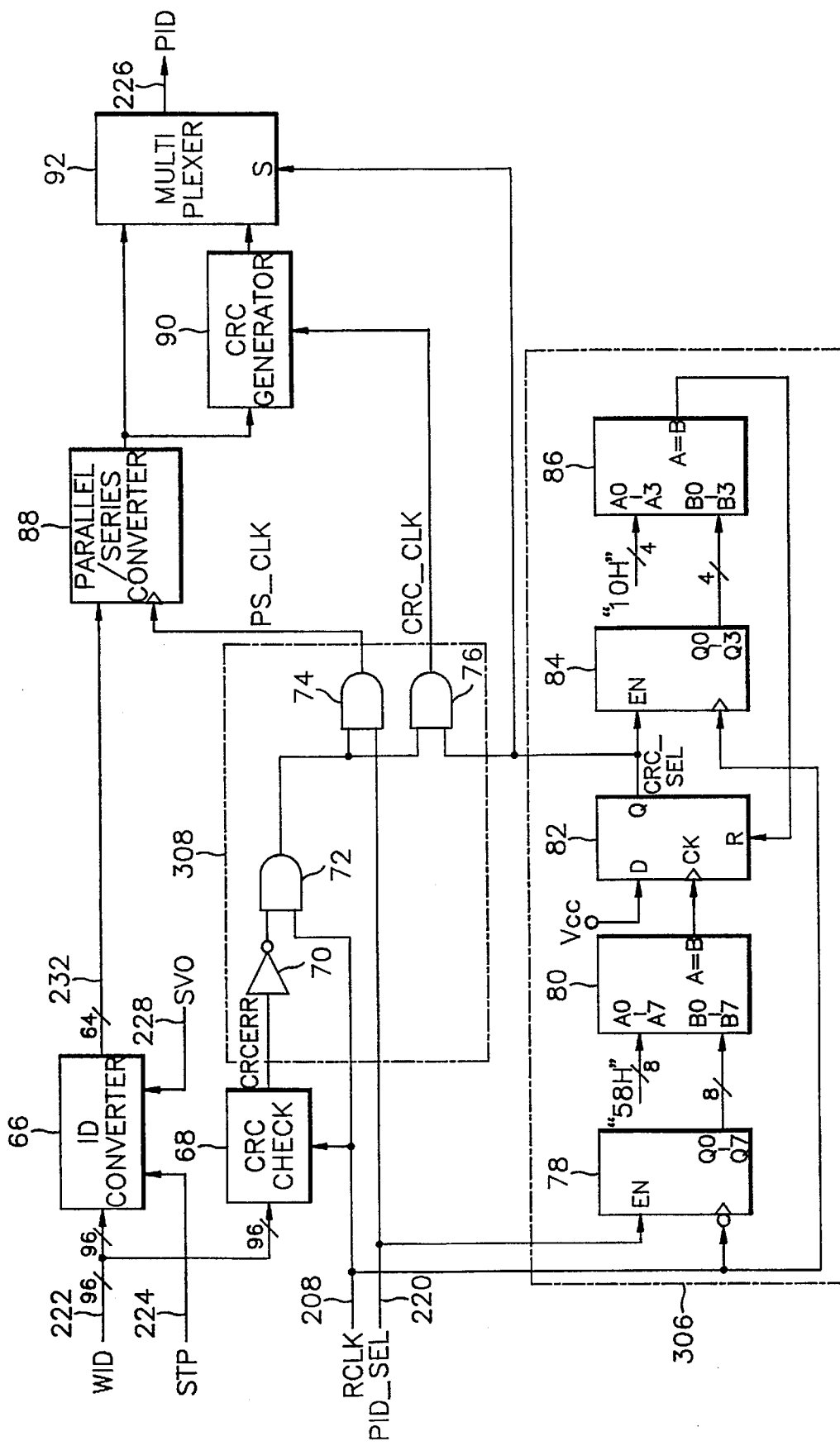
FIG. 10 is a detailed circuit diagram of an embodiment of a PID generator of FIG. 7.

FIG. 10 shows a more detailed construction of the PID generator 24 of FIG. 7. The signal lines 208, 220, 222, 224, 226, and 228 of FIG. 10 have the same reference numerals as those of FIG. 7.

In response to the sector pulse STP from the WID of 96 bits read from the WID reader 20, the ID convertor 66 generates the PID of 64 bits for the corresponding data sector. That is, the ID convertor 66 generates the real PID up to the division information SP2 from the ID address mark of FIG. 6.

After generating a check sum for the WID of 96 bits read from the WID reader 20, the CRC detector 68 checks whether error is generated or not by comparing the check sum with the CRC of the WID to thereby generate the CRC error detection signal CRCERR set to the logic "high" during the error generation. As mentioned above, since it is a general art to detect the CRC, the description on the art will not be omitted.

The CRC interval selector 306 is comprised of the counters 78 and 84, the comparators 80 and 86, and the flip-flop 82. In response to the generation of the PID selection signal PID-SEL, the CRC interval selector 306 begins to count the pulse of the read clock signal RCLK. After 88 bits from the counting operation, i.e., in the start position of the CRC shown in FIG. 6, the CRC interval selector 306 generates the CRC selection signal CRC-SEL set to the logic "high". The counter 78 counts the pulse of the read clock signal RCLK by being enabled by the PID selection signal PID-SEL during the PID field interval to thereby output the count data of 8 bits to the comparator 80. The comparator 80 compares the count data output from the counter 78 with the predetermined value "58H" (88, in terms of decimal). If the value is the same to each other, the comparator 80 outputs the signal at the logic "high" state. Here, the value "58H" is used for detecting the start position of the CRC as shown in FIG. 6 and corresponds to the interval between the preamble and the division information SP2. That is, the comparator 80 generates the signal set to the logic "high" state after 88 bits (11 bytes) from the start of the PID field interval. The flip-flop 82 outputs the CRC selection signal CRC-SEL set to the logic "high" by latching the power supply voltage Vcc of the data input terminal D in the failing edge of the output signal of the comparator 80. The counter 84 counts the pulse of the read clock signal RCLK by being enabled by the CRC selection signal CRC-SEL set to the logic "high" state to thereby output the count data of 4 bits obtained by the counting operation. The comparator 86 compares the count data output from the counter 84 with the predetermined value "10H" (16 in terms of decimal). If the value is the same to each other, the comparator 86 applies the signal set to the logic "high" to the reset terminal R of the flip-flop 82 to thereby reset the flip-flop 82. According to the above reset operation, the CRC selection signal CRC-SEL set to the logic "high" state is output during the CRC interval in the irreversible output terminal Q of the flip-flop 82. Here, the value "10H" corresponds to the CRC interval of 16 bits (8 bytes) as shown in FIG. 6.

The clock generator 308 is comprised of an inverter 70 and AND gates 72, 74, and 76. When the CRC error detection signal CRCERR is not generated and the PID selection signal PID-SEL set to the logic "high" is generated, the clock generator 308 provides the read clock signal RCLK to the parallel/serial convertor 88 as a shift clock signal PS-CLK. On the other hand, when the CRC error detection signal CRCERR is not generated and the CRC selection signal CRC selection signal CRC-SEL is generated, the clock generator 308 provides the read clock signal RCLK to the CRC generator 90 as the CRC clock signal CRC-CLK. The inverter 70 reverses the CRC error detection signal CRCERR to thereby apply the signal to the AND gate 72. The AND gate 72 ANDs an output of the inverter 70 and the read clock signal RCLK. The AND gate 74 ANDs the output signal of the AND gate 72 and the PID selection signal PID-SEL. Therefore, when the CRC error detection signal CRCERR is not generated and the PID selection signal PID-SEL is generated, the read clock signal RCLK is output to the AND gate 74 and is then applied to the parallel/serial convertor 88 as the shift clock signal PS-CLK. The AND gate 76 ANDs an output signal of the AND gate 74 and the CRC selection signal CRC-SEL. Therefore, when the CRC error detection signal CRCERR is not generated and the CRC selection signal CRC-SEL is generated, the read clock signal RCLK is output to the AND gate 76 and is then applied to the CRC generator 90 as the CRC clock signal CRC-CLK.

The parallel/serial converter 88 shifts the PID of 64 bits output from the ID convertor 66 by the shift clock signal PC-CLK to thereby convert the PID into the serial data. In synchronization with the CRC clock signal CRC-SEL, the CRC generator 90 generates the CRC of 2 bytes for serial PID. The multiplexer 92 selects the output data of the parallel/serial convertor 88 until the CRC, as shown in FIG. 6, when the CRC selection signal CRC-SEL becomes the logic "low" state, whereas it selects the output CRC of the CRC generator 90 and outputs the CRC as the PID in the CRC interval when the CRC selection signal CRC-SEL becomes the logic "high" state.

Figure 11:
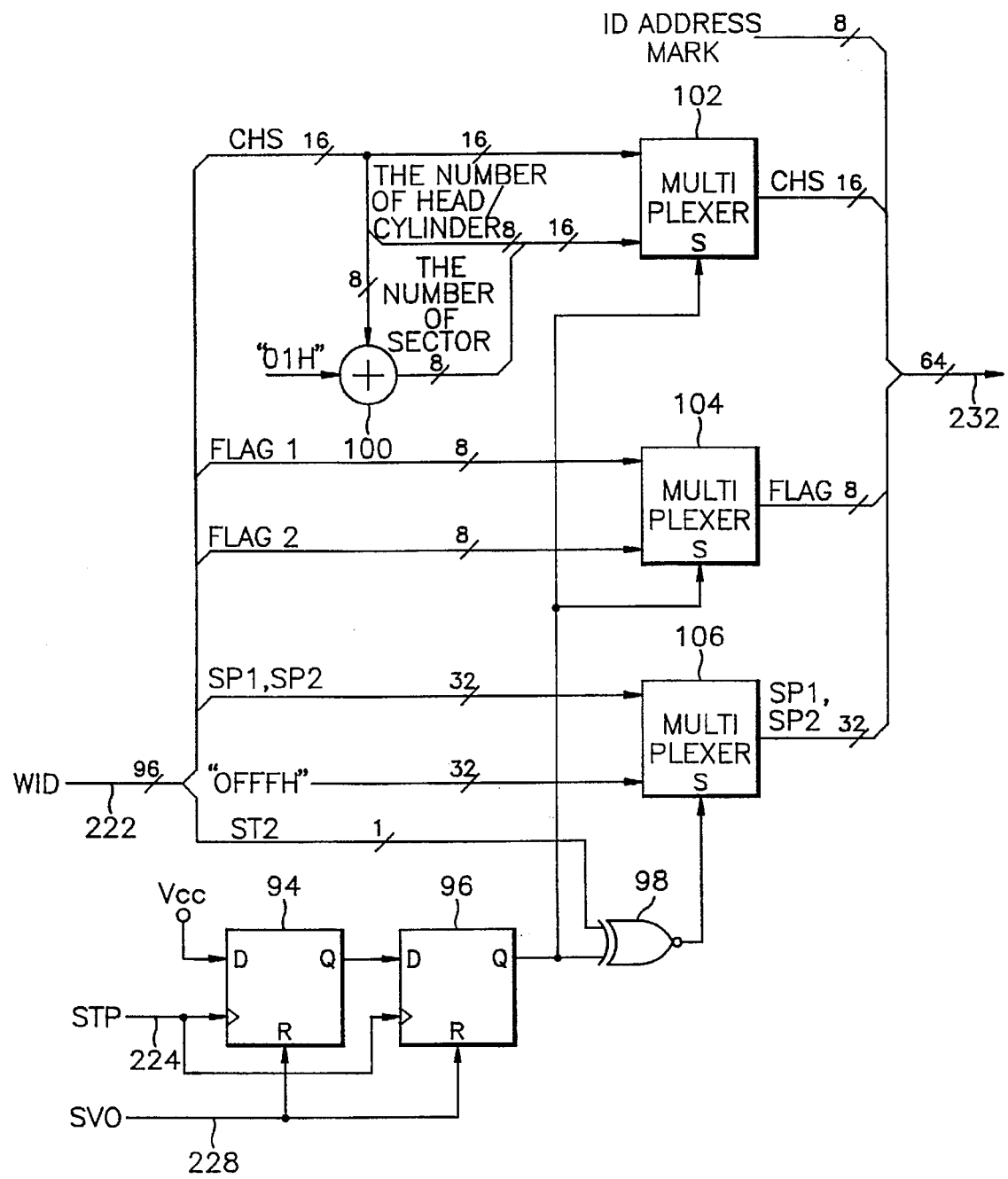
FIG. 11 is a detailed circuit diagram of an embodiment of an ID convertor of FIG. 10.

FIG. 11 shows a more detailed ID convertor 66 of FIG. 10. The signal lines 222, 224, and 228 of FIG. 11 have the same reference numerals as those of FIGS. 7 and 10. Further, the signal line 232 has the same reference numeral as that of FIG. 10. The flip-flops 94 and 96 are reset for each servo pulse SVO. Thereafter, the flip-flop 96 outputs the data set to the "low" state in one data information area, i.e., in the PID field interval for the first data sector, when the first sector pulse STP is generated after reading the WID. Moreover, the flip-flop 96 outputs the data set to the "high" state in one data information area, i.e., in the PID field interval for the second data sector, when the second sector pulse STP is generated after reading the WID. An exclusive NOR gate 98 exclusively NORs the most significant bit of the position information ST2 of the WID and an output of the flip-flop 96 to thereby apply the NORed output to a select terminal S of the multiplexer 106. The adder 100 adds the sector number ST-NO of the real WID information of 96 bits to "01H". The multiplexers 102 and 104 are controlled by the output of the flip-flop 96. The multiplexers 106 is controlled by the output of the exclusive NOR gate 98. The multiplexer 102 selects head information CHS of the WID in the PID interval for the first data sector. Further, in the PID interval for the second data sector, the multiplexer 102 selects the head information CHS and outputs it as the head information CHS of the corresponding PID, the head information CHS being increased by 1 by the adder 100 from the sector number ST-NO. The multiplexer 104 selects the flag 1 of the WID in the PID interval for the first data sector. Further, in the PID interval for the second data sector, the multiplexer 104 selects the flag 2 of the WID during the PID interval for the second data sector to thereby output it as the flag of the corresponding PID. In case that the first data sector is divided within the corresponding data information area, i.e., the most significant bit of the location information ST2 of the WID is "1", the multiplexer 106 selects the division information SP1 and SP2 of the WID in the PID interval for the first data sector, whereas it selects an any value "OFFFH" in the PID interval for the second data sector to thereby output the value as the division information SP1 and SP2 for the corresponding PID. On the other hand, in case that the first data sector is not divided within the corresponding data information area, i.e., the most significant bit of the location information ST2 of the WID is "0", the multiplexer 106 selects any value "OFFFH" in the PID interval for the first data sector, whereas it selects the division information SP1 and SP2 of the WID in the PID interval for the second data sector to thereby output it as the division information SP1 and SP2 for the corresponding PID. The head information CHS of 2 bytes, the flag of 1 byte, and the division information SP1 and SP2 of 4 bytes output each in the multiplexers 102, 104, and 106, are applied to the parallel/serial converter 88 as the predetermined ID address mark of 1 byte and the real PID information of 64 bytes.

Figure 12:
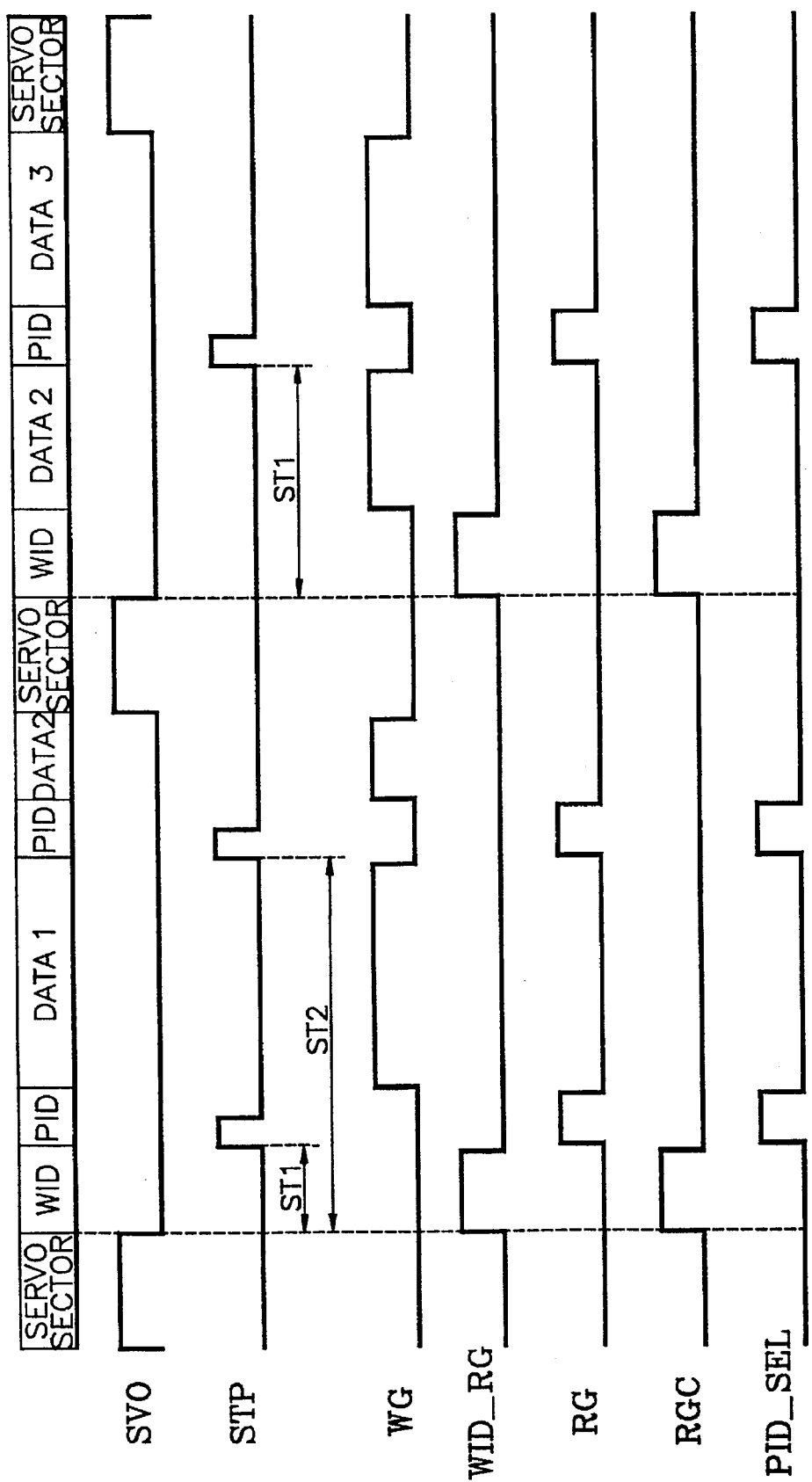
FIG. 12 is an operational timing diagram in case of recording data on the magnetic disc surface having another format according to the present invention.

FIG. 12 shows an operational timing diagram when the data is recorded on the magnetic disc surface having a format according to the present invention and also shows an embodiment that the second data sector is divided by the next data information area.

With respect to the operational timing diagram of FIG. 12, it will be in detail explained that data is recorded on the magnetic disc surface having the sector format of FIGS. 4 to 6 according to the present invention. After every servo, the WID reader 20 reads the WID by activating the read gate control signal RGC through the WID read gate signal WID-RG in the falling edge of the servo pulse SVO during the WID. Thereafter, the WID reader 20 inactivates the read gate control signal RGC. The read gate control signal RGC is generated under the control of the read/write channel 8 by the WID reader 20, regardless of the disc data controller 28. The address mark detector 32 enables the WID storage circuit 302 when the mad data RDATA is the same as the predetermined address mark pattern by comparing them as the unit of 8 bits, so as to store the WID of 96 bits from the head/cylinder number to the division information SP2 in the register 38. Further, the CRC checker 68 checks whether or not the length of the WID, i.e., from the head/cylinder number to the division information SP2, is correct in the end of the WID. The sector pulse generator 22 generates the sector pulse STP from the end of every servo area to the start of the PID interval. The PID generator 24 generates the corresponding PID by classifying the first and second data sectors by the sector pulse STP. At this time, in case the CRC error is not generated in the WID, the multiplexer 26 transfers the PID generated in the PID interval by the PID selection signal PID-SEL to the disc data controller 28. Then, the disc data controller 28 enables the write gate signal WG to the "high" state during the corresponding data field after the input of the PID and then outputs the write data WDATA to the ENDEC 18. The write gate signal WG is entirely applied to the mad/write channel 8. According to the application, the write data WDATA is decoded and is then recorded in the corresponding data sector of the magnetic disc apparatus by the head through the preamplifier 12.

As discussed above, since the PID is generated from the WID and is applied to the disc data controller 28, it is unnecessary to read the ID for the next data sector from the magnetic disc surface after recording the data in one data sector. Therefore, it is also unnecessary to have the timing margin according to the write/read change of the head 10. Only, as a gap, the PID interval related with the data transfer rate is needed in the magnetic disc apparatus.

Accordingly, it is possible to increase the storage capacity of the magnetic disc apparatus by eliminating the timing margin needed in the write-read change between the ID and the data.

For example, if hundred data sectors exist in one track, as mentioned above, in case that a thin film head is used, it is possible to more use the time (7 μs×100)~(10 μs×100)=700 μs ~1000 μs as data storage. Further, in case that the rotary speed of the magnetic disc apparatus is 13.3 ms (4500RPM), it is possible to more use the time 900/13300×100=6.8% as the data storage.

Figure 13:
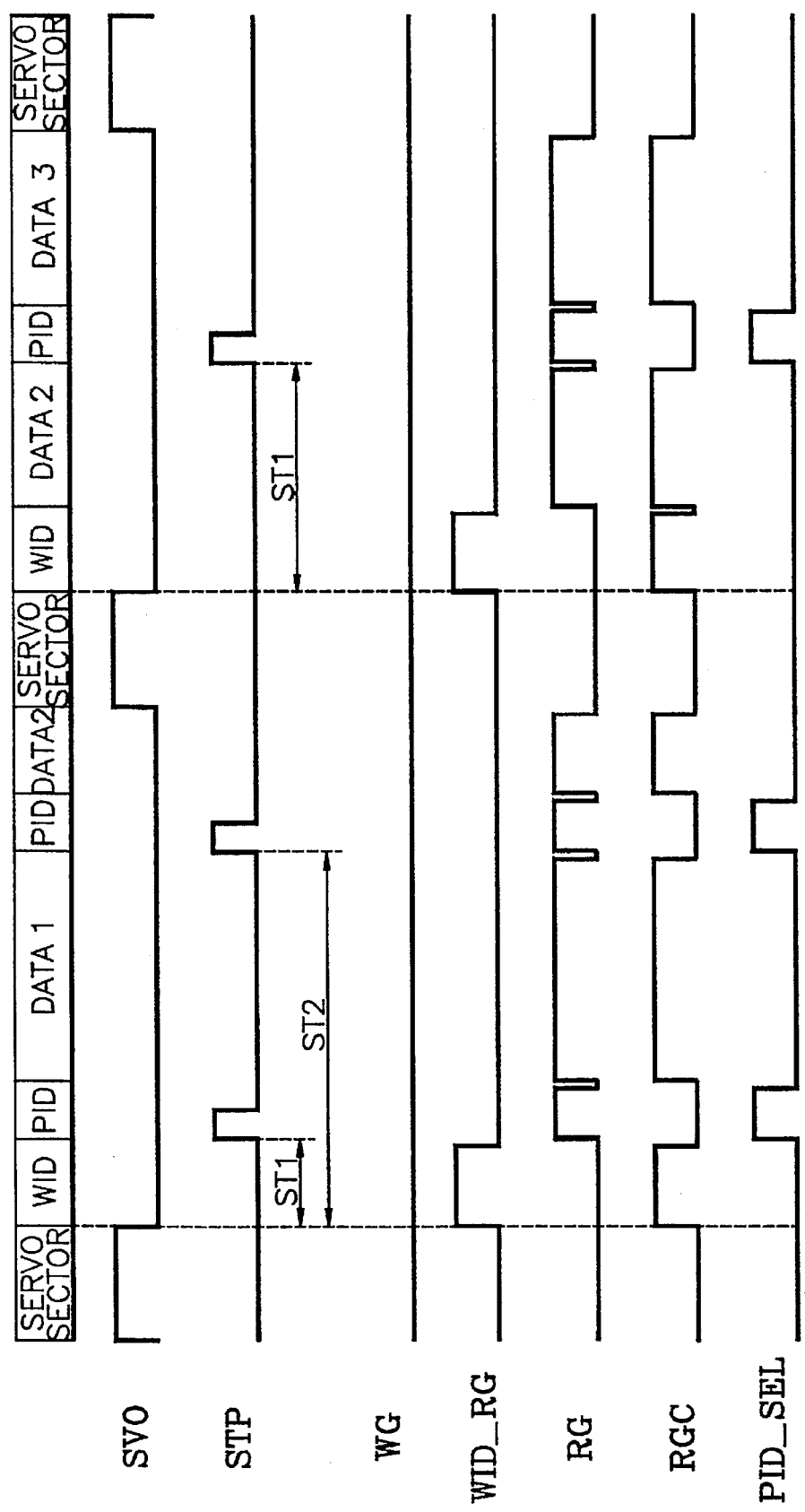
FIG. 13 is an operational timing diagram in case of reading the data recorded on the magnetic disc surface having another format according to the present invention.

FIG. 13 shows an operational timing diagram when data recorded on the magnetic disc surface having the format according to the present invention is read, and also shows an example that the second data sector is divided by the next data information area.

With respect to FIG. 13, in case that the data is read from the magnetic disc surface having the sector formats of FIGS. 4 to 6, the operation is as follows. The WID reader 20, as shown in FIG. 13, reads the WID by activating the read gate control signal RGC in the falling edge of the servo pulse SVO through the WID read gate signal WID-RG during the WID. And, the inactive operation performed after reading is equal to the case mentioned in the above write mode. Only in this case, it is possible to read the data by activating the read gate control signal RGC through the read gate signal RG generated from the data field interval in the disc data controller 28. At this time, the address mark detector 32 enables the WID storage circuit 302 when the read data RDATA is the same as the predetermined address mark pattern by comparing them as the unit of 8 bits, so as to store the WID of 96 bits from the head/cylinder number to the division information SP2 in the register 38. Further, the CRC checker 68 checks whether or not the length of the WID, i.e., from the head/cylinder number to the division information SP2, is correct in the end of the WID. The sector pulse generator 22 generates the sector pulse STP from the end of every servo area to the start of the PID interval. The PID generator 24 generates the corresponding PID by classifying the first and second data sectors by the sector pulse STP. At this time, in case the CRC error is not generated in the WID, the multiplexer 26 transfers the PID generated in the PID interval by the PID selection signal PID-SEL to the disc data controller 28. Then, the disc data controller 28 enables the read gate signal RG to the logic "high" state for the data field after the input of the PID and then inputs the read data RDATA to the disc data controller 28 through the multiplexer 26.

As mentioned above, the timing margin needed in the write-read change between the ID and the data is eliminated in the present invention, so that there is an advantage capable of increasing the storage capacity of the magnetic disc apparatus.

In the meantime, although only the preferred embodiment of the present invention is described therein, various modifications can be implemented within the spirit and the scope of the present invention. In particular, in the embodiment of the present invention, although one or two entire data sectors or the divided data sectors exist in only one data information area, it is possible to apply the embodiment thereof to all the data information areas in the magnetic disc apparatus having the constant-density recording type. For example, in case that three entire data sectors or the divided data sectors exist in one data information area, one flag for the third data sector is only added to that of the WID and the location information for the third data sector is only added to that of the WID in the present invention. Further, it is not necessary to further add the division information SP1 and SP2, since they themselves become the division information for the divided one among the data sectors started in the one data information area. Moreover, as mentioned above, the WID reader 20, the sector pulse generator 22, and the PID generator 24 are only changed to correspond with the added information.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A magnetic disc apparatus employing constant-density recording, comprising:

a plurality of tracks extending in a circumferential direction along a surface of said magnetic disc apparatus;

a plurality of servo and data information areas corresponding to each one of said plurality of tracks;

a wedge identification field for recording first data identifying data sectors located within a corresponding one of said plurality of data information areas, said wedge identification field occurring only once for each one of said plurality of data information areas; and a pseudo identification field corresponding to each one of said data sectors, said pseudo identification field representing an interval accommodating transfer of second data generated from said first data to a controller of said magnetic disc apparatus during access of said magnetic disc apparatus, said second data identifying a corresponding one of said data sectors.

2. A magnetic disc apparatus employing constant-density recording, comprising:

a plurality of tracks extending in a circumferential direction along a surface of said magnetic disc apparatus;

a plurality of servo and data information areas provided in the circumferential direction of each one of said plurality of tracks;

a wedge identification field positioned behind each one of said plurality of servo information areas, for recording first data identifying data sectors located within a corresponding one of said plurality of data information areas;

a pseudo identification field positioned at a first portion of each one of said data sectors, said pseudo identification field representing an interval accommodating transfer of second data generated from said first data to a controller of said magnetic disc apparatus during access of said magnetic disc apparatus, said second data identifying a corresponding one of said data sectors; and a data field positioned behind said pseudo identification field, said data field and said pseudo identification field comprising a single one of said data sectors.

3. The magnetic disc apparatus as claimed in claim 2, wherein two said data sectors are positioned behind said wedge identification field.

4. The magnetic disc apparatus as claimed in claim 3, wherein said wedge identification field comprises:

a first area for recording head information to identify a first one of said data sectors;

a second area positioned in front of said first area for recording an identification address mark indicating a starting point of said head information;

a third area for recording a flag indicating whether said first one of said data sectors is available, said first one of said data sectors being positioned in said corresponding one of said plurality of data information areas;

a fourth area for recording location information indicating a starting point of said first one of said data sectors positioned in said corresponding one of plurality of data information areas; and a fifth area for recording division information indicating a dividing point of said first one of said data sectors positioned in said corresponding one of plurality of data information areas.

5. The magnetic disc apparatus as claimed in claim 4, wherein said wedge identification field further comprises:

a sixth area positioned in the front of said second area, for recording a preamble comprising a clock synchronization signal for said wedge identification field;

a seventh area positioned behind said fifth area, for recording an error detection code for detecting and correcting errors in information to be written in said wedge identification field; and an eighth area positioned behind said seventh area, for recording a postamble of said wedge identification field.

6. A magnetic disc driver for accessing digital information through a read/write channel on a magnetic disc surface employing constant-density recording, said magnetic disc surface having a wedge identification field positioned behind servo information areas for recording first data identifying data sectors in a corresponding data information area; a pseudo identification field positioned at a first portion of each one of said data sectors; and a data field positioned behind said pseudo identification field, said magnetic disc driver comprising:

a wedge identification reader for reading said first data through said read/write channel at an ending time of each one of said servo information areas;

a sector pulse generator for generating a sector pulse indicating a starting position of each one of said data sectors positioned within said corresponding data information area, said sector pulse being generated in response to location information detected in said first data indicating said starting position of each one of said data sectors positioned within said corresponding data information area; and a pseudo identification generator for generating from said first data, second data to identify a corresponding one of said data sectors, in response to said sector pulse.

7. The magnetic disc driver as claimed in claim 6, wherein said pseudo identification field represents an interval corresponding to a transfer time of said second data.

8. The magnetic disc driver as claimed in claim 7, wherein said first data comprises:

first head information to identify said data sectors positioned in said corresponding data information area;

a first identification address mark to indicate a beginning point of said first head information;

a first flag indicating whether each one of said data sectors positioned in said corresponding data information area is available;

first location information indicating said starting position of each one of said data sectors positioned in said corresponding data information area; and first division information indicating how each one of said data sectors positioned in said corresponding data information area is divided.

9. The magnetic disc driver as claimed in claim 8, wherein said first data further comprises:

a first preamble for synchronizing detection of said wedge identification field, said first preamble being positioned in front of said first identification address mark;

a first error detection code positioned behind said first division information for detecting errors in said first data; and a first postamble positioned behind said first error detection code.

10. The magnetic disc driver as claimed in claim 9, wherein said wedge identification reader comprises:

a serial/parallel converter connected to said read/write channel, for converting serial data read from said magnetic disc surface into parallel data;

an address mark detector for detecting said first identification address mark of said first data from said parallel data;

wedge identification storage means for serially storing said parallel data corresponding to said first data, in response to detection of said first identification address mark by said address mark detector; and a timing controller for operating said read/write channel as a read mode during an interval corresponding to said wedge identification field and generating a pseudo identification selection signal during an interval corresponding to said pseudo identification field.

11. The magnetic disc driver as claimed in claim 10, wherein said pseudo identification generator comprises:

an identification converter for generating said second data from said first data, in response to said sector pulse;

an error detector for detecting errors in said first data by using said first error detection code included in said first data;

an error detection code interval selector for generating an error detection code selection signal at a starting position of a second error detection code of said second data, in response to said pseudo identification selection signal;

a parallel/serial converter for converting said second data into serial data;

an error correction code generator for generating said second error detection code for said serial data;

a multiplexer for adding said serial data to said second error detection code in dependence upon said pseudo identification selection signal; and a clock generator for providing a clock signal to said parallel/serial converter when no error is produced in said first data, and for providing an error detection code clock signal to said error detection code generator during generation of said second data.

12. The magnetic disc driver as claimed in claim 11, wherein said second data generated by said identification converter further comprises:

second head information for identifying said corresponding one of said data sectors;

a second identification address mark positioned in front of said second head information, for indicating a beginning point of said second head information;

a second flag for indicating whether said corresponding one of said data sectors is available; and second division information indicating how said corresponding one of said data sectors is divided.

13. The magnetic disc driver as claimed in claim 12, wherein said second data further comprises:

a second preamble for synchronizing detection of said second data, said second preamble being positioned in a front portion of said second identification address mark of said second data; and a second postamble positioned behind said second error detection code for said second data.

14. A magnetic disc driver for accessing digital information on a magnetic disc surface employing constant-density recording and having a wedge identification field positioned behind servo information areas for recording first data to identify data sectors in a corresponding data information area; a pseudo identification field positioned at a first portion of each one of said data sectors; and a data field positioned behind said pseudo identification field, said magnetic disc driver comprising:

a disc data controller for generating, in a read mode, a read gate signal during intervals corresponding to said pseudo identification field and said data field while simultaneously receiving data read from said magnetic disc surface, and in a write mode, for generating said read gate signal during said interval corresponding to said pseudo identification field and a write gate signal during said interval corresponding to said data field while simultaneously outputting write data to be written on said magnetic disc surface, in response to receipt of a sector pulse indicating a starting position of one of said data sectors in said corresponding data information area;

a read/write channel for detecting data represented as a first analog signal read from said magnetic disc surface to thereby decode and output detected data in response to input of a read gate control signal, and for encoding said write data received from said disc data controller to thereby record said write data as a second analog signal on said magnetic disc surface in response to input of said write gate signal;

a wedge identification reader for reading said first data from said read/write channel by generating said read gate control signal and applying said read gate control signal to said read/write channel during an interval corresponding to said wedge identification field at an ending time of each one of said servo information areas, for applying said read gate control signal to said read/write channel during said interval corresponding to said data field in dependence upon said read gate signal of said read mode, and for generating a pseudo identification selection signal during said interval corresponding to said pseudo identification field;

a sector pulse generator for generating said sector pulse from location information in said first data indicating said starting position of said one of said data sectors in said corresponding data information area;

a pseudo identification generator for generating second data to identify a corresponding data sector from said first data, in response to said sector pulse; and a selector for selecting said second data in dependence upon said pseudo identification selection signal during said interval corresponding to said pseudo identification field, and for selecting an output of said read/write channel during intervals other than said interval corresponding to said pseudo identification field to thereby apply a selected signal to said disc data controller.

15. The magnetic disc driver as claimed in claim 14, wherein said pseudo identification field represents an interval corresponding to a transfer time of said second data.

16. The magnetic disc driver as claimed in claim 15, wherein said first data comprises:

first head information for identifying said data sectors positioned in said corresponding data information area;

a first identification address mark positioned in front of said head information for indicating a starting point of said first head information;

a first flag indicating whether each one of said data sectors positioned in said corresponding data information area is available;

first location information indicating said starting position of each one of said data sector positioned in said corresponding data information area; and first division information indicating how each one of said data sectors positioned within said corresponding data information area is divided.

17. The magnetic disc driver as claimed in claim 16, wherein said first data further comprises:

a first preamble for synchronizing detection of said wedge identification field, said first preamble being positioned in front of said first identification address mark;

a first error detection code positioned behind said first division information for detecting errors in said first data; and a first postamble positioned behind said first error detection code.

18. The magnetic disc driver as claimed in claim 17, wherein said wedge identification reader comprises:

a serial/parallel converter connected to said read/write channel, for converting serial data read from said magnetic disc surface into parallel data;

an address mark detector for detecting said first identification address mark of said first data from said parallel data;

wedge identification storage means for serially storing said parallel data corresponding to said first data in response to detection of said first identification address mark by said address mark detector; and a timing controller for generating said read gate control signal during said interval corresponding to said wedge identification field, for generating said read gate control signal in dependence upon said read gate signal during said interval corresponding to said data field, and for generating said pseudo identification selection signal during said interval corresponding to said pseudo identification field, in response to said ending time of each one of said servo information areas.

19. The magnetic disc driver as claimed in claim 18, wherein said pseudo identification generator comprises:

an identification converter for generating said second data from said first data, in response to said sector pulse;

an error detector for detecting errors in said first data by using said first error detection code included in said first data;

an error detection code interval selector for generating an error detection code selection signal at a starting position of a second error detection code for said second data, in response to said pseudo identification selection signal;

a parallel/serial converter for converting said second data into serial data;

an error correction code generator for generating said second error detection code for said serial data;

a multiplexer for adding said serial data to said second error detection code in dependence upon said pseudo identification selection signal; and a clock generator for providing a clock signal to said parallel/serial converter when no error is produced in said first dam, and for providing an error detection code clock signal to said error detection code generator during generation of said second data.

20. The magnetic disc driver as claimed in claim 19, wherein said second data generated by said identification converter further comprises:

second head information for identifying said corresponding one of said data sectors;

a second identification address mark positioned in front of said second head information for indicating a beginning point of said second head information;

a second flag for indicating whether said corresponding one of said data sectors is available; and second division information indicating how said corresponding one of said data sectors is divided.

21. The magnetic disc driver as claimed in claim 20, wherein said second data further comprises:

a second preamble for synchronizing detection of said second data, said second preamble being positioned in a front portion of said second identification address mark of said second data; and a second postamble positioned behind said second error detection code for said second data.

22. A method for accessing digital information on a magnetic disc surface employing constant-density recording, said method comprising the steps of:

recording first data indicative of locations of data sectors in a data information area on said magnetic disc surface, said first data being recorded in only one interval for said data information area; and generating second data from said first data, said second data indicative of a location of a corresponding one of said data sectors in said data information area, said second data being used to access said corresponding one of said data sectors in said data information area.

23. A method for accessing digital information on a magnetic disc surface employing constant-density recording and having a wedge identification field positioned behind servo information areas for recording first data identifying data sectors in a corresponding data information area; a pseudo identification field positioned at a first portion of each one of said data sectors; and a data field positioned behind said pseudo identification field, said method comprising the steps of:

reading said first data from said magnetic disc surface during an interval corresponding to said wedge identification field in response to an end of each one of said servo information areas;

generating a sector pulse from location information in said first data indicating a starting position of each one of said data sectors in said corresponding data information area;

generating second data from said first data in response to said sector pulse, said second data identifying a corresponding one of said data sectors in said corresponding data information area to be accessed; and accessing said corresponding one of said data sectors identified by said second data.

24. The method as claimed in claim 23, wherein said first data comprises:

a first preamble for synchronizing detection of said wedge identification field;

first head information for identifying said data sectors in said corresponding data information area;

a first identification address mark positioned in front of said first head information to indicate a beginning point of said first head information;

a first flag indicating whether each one of said data sectors positioned in said corresponding data information area is available;

first location information indicating said starting position of each said one of said data sectors positioned in said corresponding data information area;

first division information indicating how each one of said data sectors positioned in said corresponding data information area is divided;

a first error detection code for detecting errors in said first data, said first error detection code positioned behind said first division information; and a first postamble positioned behind said first error detection code.

25. The method as claimed in claim 24, wherein said step of reading said first data further comprises the steps of:

reading said first preamble in said wedge identification field from said magnetic disc surface during said interval corresponding to said wedge identification field in response to said end of each one of said servo information areas;

reading portions of said first data positioned behind said first identification address mark from said wedge identification field in response to detection of said first identification address mark of said first data;

determining whether an error has occurred in said reading of said portions of said first data positioned behind said first identification address mark; and reading data with respect to a next wedge identification field when said error has occurred in said reading of said portions of said first data positioned behind said first identification address mark.

26. The method as claimed in claim 25, wherein said second data comprises:

a second preamble for synchronizing detection of said second data;

second head information for identifying said corresponding one of said data sectors;

a second identification address mark positioned in front of said second head information for indicating a beginning point of said second head information;

a second flag for indicating whether said corresponding one of said data sectors is available;

second division information indicating how said corresponding one of said data sectors is divided; and a second postamble positioned behind a second error detection code for said second data.

27. The method as claimed in claim 26, wherein said step of generating said second data further comprises a step of generating said second error detection code for said second data to indicate errors in said second data.

28. A magnetic disc driver for accessing digital information through a read/write channel on a magnetic disc surface employing constant-density recording, said magnetic disc surface having a wedge identification field positioned behind servo information areas for recording first data identifying data sectors in a corresponding data information area; a pseudo identification field positioned at a first portion of each one of said data sectors; and a data field positioned behind said pseudo identification field, said magnetic disc driver comprising:

a wedge identification reader for reading said first data through said read/write channel at an ending time of each one of said servo information areas, said wedge identification reader comprising:

a serial/parallel converter connected to said read/write channel, for converting serial data read from said magnetic disc surface into parallel data;

an address mark detector for detecting a first identification address mark of said first data from said parallel data;

wedge identification storage means for serially storing said parallel data corresponding to said first data, in response to detection of said first identification address mark by said address mark detector; and a timing controller for operating said read/write channel as a read mode during an interval corresponding to said wedge identification field and generating a pseudo identification selection signal during an interval corresponding to said pseudo identification field;

a sector pulse generator for generating a sector pulse indicating a starting position of each one of said data sectors positioned within said corresponding data information area, said sector pulse being generated in response to location information detected in said first data indicating said starting position of each one of said data sectors positioned within said corresponding data information area; and a pseudo identification generator for generating from said first data, second data identifying a corresponding one of said data sectors, in response to said sector pulse.

* * * * *